United States Patent
Cunningham et al.

(10) Patent No.: US 12,151,563 B2
(45) Date of Patent: Nov. 26, 2024

(54) TORQUE MANAGEMENT IN MULTI-MOTOR ELECTRIC VEHICLE

(71) Applicant: Nikola Corporation, Phoenix, AZ (US)

(72) Inventors: Joshua L. Cunningham, Phoenix, AZ (US); T. Neil McLemore, Phoenix, AZ (US); Ashfaque B. Shafique, Chandler, AZ (US)

(73) Assignee: Nikola Corporation, Phoenix, AZ (US)

( * ) Notice: Subject to any disclaimer, the term of this patent is extended or adjusted under 35 U.S.C. 154(b) by 0 days.

(21) Appl. No.: 18/595,745

(22) Filed: Mar. 5, 2024

(65) Prior Publication Data
US 2024/0351450 A1    Oct. 24, 2024

Related U.S. Application Data

(60) Provisional application No. 63/497,109, filed on Apr. 19, 2023.

(51) Int. Cl.
*B60L 15/20*    (2006.01)

(52) U.S. Cl.
CPC ....... *B60L 15/2045* (2013.01); *B60L 2220/42* (2013.01); *B60L 2240/421* (2013.01); *B60L 2240/423* (2013.01); *B60L 2240/425* (2013.01); *B60L 2240/427* (2013.01)

(58) Field of Classification Search
CPC ............. B60L 15/2045; B60L 2220/42; B60L 2240/421; B60L 2240/423; B60L 2240/425; B60L 2240/427
See application file for complete search history.

(56) References Cited

U.S. PATENT DOCUMENTS

| | | |
|---|---|---|
| 8,453,770 B2 | 6/2013 | Tang |
| 10,131,248 B2 | 11/2018 | Tang |
| 11,007,880 B2 * | 5/2021 | Plianos ............... B60L 15/2009 |
| 11,267,346 B2 | 3/2022 | Joseph et al. |
| 2019/0092188 A1 * | 3/2019 | Plianos ............... B60L 15/2009 |
| 2022/0289044 A1 | 9/2022 | Downs, Jr. et al. |
| 2023/0114289 A1 | 4/2023 | Islam et al. |

FOREIGN PATENT DOCUMENTS

JP    2018098985 A    6/2018

OTHER PUBLICATIONS

International Searching Authority, International Search Report and Written Opinion dated May 17, 2024 in International Search No. PCT/US2024/018542.
Nezamuddin, O., et al. "A Multi-Motor Architecture for Electric Vehicles." IEEE Transportation Electrification Conference and Expo (ITEC), (2019) 1-6. https://doi.org/10.1109/ITEC.2019.8790582.

* cited by examiner

*Primary Examiner* — Tyler J Lee
(74) *Attorney, Agent, or Firm* — Snell & Wilmer L.L.P.

(57) ABSTRACT

The present disclosure provides a method for torque management in a multi-motor electric vehicle. The method may include receiving a total torque request value from a vehicle control module (VCM), determining a first torque split value associated with a first motor and a second torque split value associated with a second motor, the sum of the first torque split value and the second torque split value being equal to the total torque request value, monitoring a thermal parameter of at least one of the first motor or the second motor, and adjusting the first torque split value and the second torque split value in response to the thermal parameter exceeding a threshold.

7 Claims, 4 Drawing Sheets

TORQUE MANAGEMENT IN MULTI-MOTOR ELECTRIC VEHICLE

CROSS-REFERENCE TO RELATED APPLICATION

This application claims priority to, and the benefit of, U.S. Provisional Patent Application No. 63/497,109 filed on Apr. 19, 2023 entitled "Torque Management in Multi-Motor Electric Vehicle." The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to torque management for electric vehicles.

BACKGROUND

Electric vehicles, such as battery electric vehicles (BEV), fuel cell electric vehicles (FCEV), or any other vehicle with electric drivetrain(s), utilize one or more onboard batteries that generate an electric current configured to power one or more electric motors that are further configured to operate the vehicle. Traditionally, a torque request is sent to the motors by a vehicle control module (VCM) based on inputs from the accelerator and/or the brake pedal. In some cases, this request is based on a cruise control algorithm running within the VCM.

Some conventional electric vehicles that use multi-motor systems split the torque request equally between all the motors. However, this equal split based on a total torque request does not always result in the most efficient operation of the motors at all torque request values. Accordingly, there is a need for a torque management system that determines an optimal manner of splitting a torque request between operating motors, for example, to achieve desired operating efficiency, thermal performance, or other outcomes.

SUMMARY

A multi-motor vehicle may comprise a first inverter-motor assembly comprising a first inverter and a first motor, the first inverter is electrically coupled to the first motor, a second inverter-motor assembly comprising a second inverter and a second motor, the second inverter is electrically coupled to the second motor, a vehicle control module (VCM) communicatively coupled to the first inverter and the second inverter, and a high voltage battery assembly communicatively coupled to the VCM and electrically coupled to the first inverter and the second inverter. The VCM may be configured to determine a first torque split value for the first motor and a second torque split value for the second motor based on a total torque request value, a first inverter-motor efficiency value of the first inverter-motor assembly, and a second inverter-motor efficiency value of the second inverter-motor assembly. The high voltage battery assembly may be configured to provide power to the first inverter-motor assembly and the second inverter-motor assembly according to the first torque split value and the second torque split value, respectively.

In various embodiments, the multi-motor vehicle may further comprise a first gear train coupled to the first motor and a second gear train coupled to the second motor, wherein the VCM is further configured to determine the first torque split value and the second torque split value based on a first gear train efficiency value and a second gear train efficiency value. The first gear train efficiency value and the second gear train efficiency value may be the same. The VCM may be further configured to determine the first torque split value for the first motor and the second torque split value for the second motor based on a temperature associated with the first motor and a temperature associated with the second motor. The VCM may be further configured to compare the first torque split value and the second torque split value and when the first torque split value is greater than the second torque split value, designate the first motor as a primary motor and designate the second motor as a secondary motor. The VCM may be further configured to compare the operation of the primary motor with a thermal parameter and when the thermal parameter exceeds a threshold, redesignate the first motor and the second motor. The thermal parameter may comprise one of a time period, a time period above a threshold temperature, a threshold temperature, or a difference between the temperature associated with the first motor and the temperature associated with the second motor. The time period may be in a range of 100 to 300 seconds. The difference between the temperature associated with the first motor and the temperature associated with the second motor may be between 10 degrees Celsius and 40 degrees Celsius. The VCM may be further configured to adjust the first torque split value and the second torque split value such that the second torque split value is greater than the first torque split value. The VCM may be further configured to determine the first torque split value and the second torque split value based on an energy management mode of the multi-motor vehicle. The multi-motor electric vehicle may further comprise a memory, wherein a power loss value at an operating point, the first torque split value, and the second torque split value are stored in the memory, and wherein the VCM is further configured to determine the first torque split value and the second torque split value based on the power loss value.

A method for torque management in a multi-motor electric vehicle may comprise receiving a total torque request value, determining a first torque split value associated with a first motor and a second torque split value associated with a second motor, the sum of the first torque split value and the second torque split value being equal to the total torque request value, monitoring a thermal parameter of at least one of the first motor or the second motor, and adjusting the first torque split value and the second torque split value in response to the thermal parameter exceeding a threshold.

In various embodiments, determining the first torque split value and the second torque split value may comprise determining an energy management mode of the multi-motor electric vehicle, when the energy management mode is determined to be an energy conservation mode, selecting the first torque split value and the second torque split value based on a minimum value for a power loss at an operating point, and when the energy management mode is determined to be an energy waste mode, selecting the first torque split value and the second torque split value based on a maximum value for the power loss at the operating point. The multi-motor electric vehicle may further comprise a first inverter electrically coupled to the first motor and a second inverter electrically coupled to the second motor. The thermal parameter may comprise one of a time period, a time period above a threshold temperature, a threshold temperature, or a difference between the temperature associated with the first motor and the temperature associated with the second motor.

A method for managing torque in a multi-motor electric vehicle may comprise receiving a total torque request value at a vehicle control module (VCM), determining, by the VCM, an energy management mode of the multi-motor electric vehicle, determining, by the VCM and based on the energy management mode of the multi-motor electric vehicle, a first torque split value of a first motor and a second torque split value of a second motor, wherein the first torque split value and the second torque split value are based, in part, on a power loss at an operating point, and wherein the energy management mode is based, in part, on a state of charge (SOC) of a high voltage battery assembly.

In various embodiments, the power loss may be determined based on a first efficiency of the first motor and a first inverter electrically coupled to the first motor and a second efficiency of the second motor and a second inverter electrically coupled to the second motor. The operating point may be determined using inputs of voltage, a speed of the first motor and a speed of the second motor, and the total torque request value. The method may further comprise selecting, by the VCM, an energy waste mode as the energy management mode when the SOC of the high voltage battery assembly is at a maximum and a regenerative braking event is anticipated.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, or mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with electric vehicles, fuel cell electric vehicles, compressed natural gas (CNG) vehicles, hythane (mix of hydrogen and natural gas) vehicles, and/or the like. However, various aspects of the disclosed embodiments may be adapted for performance in a variety of other systems. Further, in the context of the present disclosure, methods, systems, and articles may find particular use in any system requiring use of a battery, fuel cell, or electric motor, and/or electrical, thermal, or other control or management system of the same. As such, numerous applications of the present disclosure may be realized.

Figure 1:
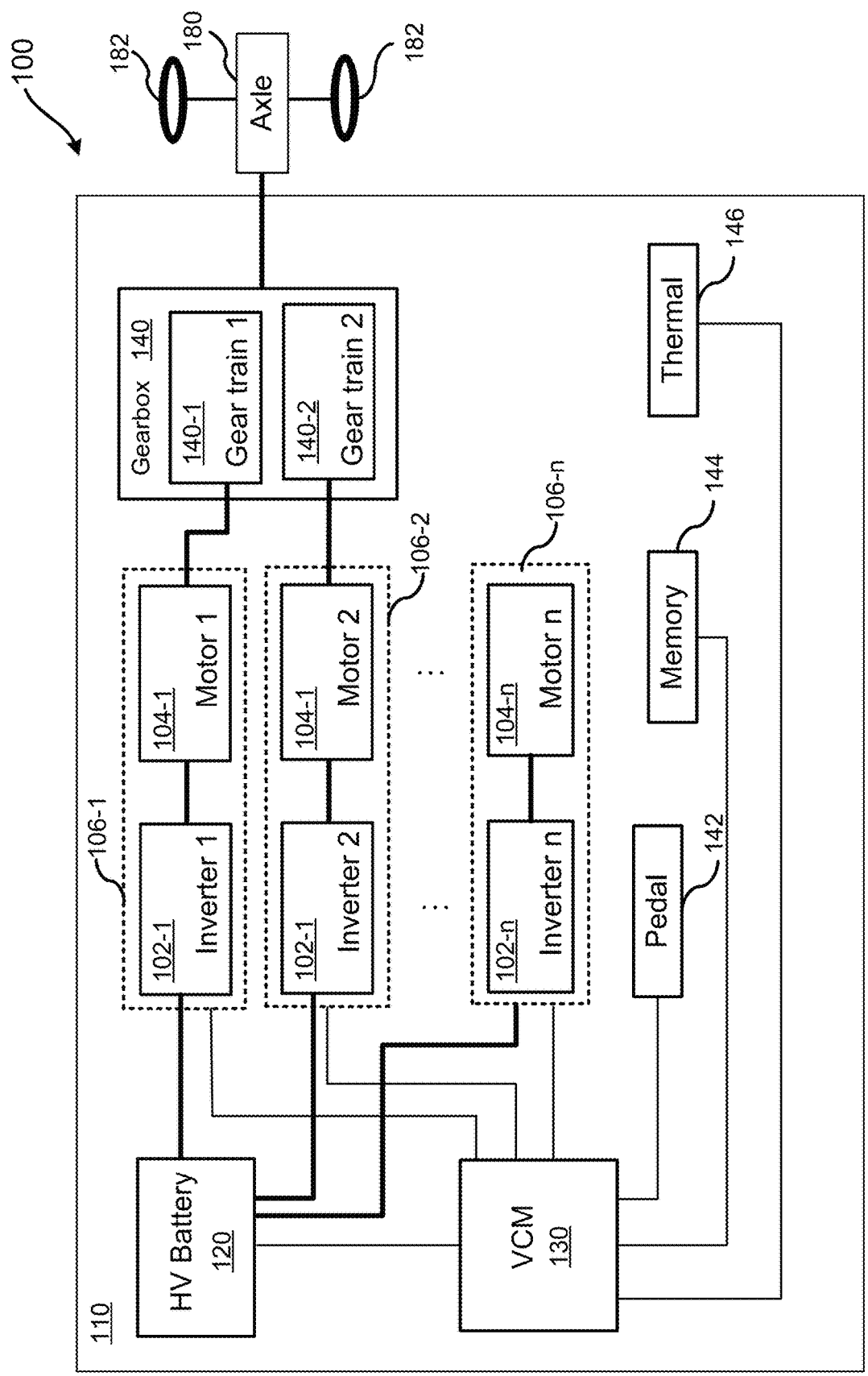
FIG. 1 illustrates a torque management system for an electric vehicle, in accordance with various embodiments.

FIG. 1 illustrates a block diagram for a torque management system 110 of a vehicle 100. In various examples, vehicle 100 is an electric vehicle incorporating an electric powertrain. More specifically, vehicle 100 is an electric commercial vehicle, such as a class 7 or a class 8 heavy-duty commercial vehicle. While described herein as a battery electric vehicle, vehicle 100 is not limited in this regard and may comprise any type, size, or function of vehicle. For example, vehicle 100 may comprise a fuel cell electric vehicle, CNG vehicle, hythane vehicle, or any other suitable multi-motor vehicle. Moreover, vehicle 100 may comprise a commercial vehicle of a different weight class (including light and/or medium duty commercial vehicles) or a passenger vehicle in various embodiments.

Torque management system 110 further comprises a vehicle control module (VCM) 130, which is responsible for the management and control of various vehicle components of vehicle 100. More specifically, VCM 130 is responsible for communication with one or more control units of vehicle 100 and may receive and transmit signals to and from various electronic control units (ECUs) and/or other components of vehicle 100. As described herein, in exemplary embodiments, VCM 130 may be any control module of vehicle 100 including, but not limited to, one or more of a body control module (BCM), powertrain control module (PCM), or the like. As described herein, two components are "communicatively coupled" with each other when at least one of the components sends information to or receives information from the other via signals.

VCM 130 is communicatively coupled to one or more inverter(s) 102 and/or HV battery assembly 120. Based on instructions received from VCM 130, HV battery assembly 120 powers electrical drivetrain components (such as, for example, electric motors and/or inverters) of vehicle 100. HV battery assembly 120 includes at least one high voltage battery pack. In exemplary embodiments, HV battery assembly 120 includes multiple battery packs. These battery packs may be electrically coupled to each other in parallel and/or in series to achieve a desired configuration. As described herein, two components are "electrically coupled" to each other when there is a direct or indirect flow of electrical current between the two components.

HV battery assembly 120 is further electrically coupled to two or more inverters 102. Inverters 102 are configured to convert direct current (DC) from HV battery 120 to alternating current (AC) to power an e-axle (such as axle 180), which is operable to drive vehicle 100. Each of the inverters 102 is further coupled to a respective electric motor 104. For example, inverter 102-1 is electrically coupled to motor 104-1, inverter 102-2 is electrically coupled to motor 104-2, inverter 102-n is electrically coupled to motor 104-n, and so on. The converted AC current from the inverters 102 powers each of the respective motor(s) 104. Each inverter and motor combination (inv+mot) 106 is further mechanically coupled to a gearbox 140. In the example shown in FIG. 1, a single gearbox 140 is coupled to all inv+mot(s) 106. However, a plurality of gearboxes 140 may be used in other embodiments. Gearbox 140 is further coupled to axle 180, responsible for driving vehicle 100. In various embodiments, gearbox 140 is mechanically coupled to axle 180 such that an output gear of gearbox 140 transmits rotation to one or more half shafts of axle 180 to propel vehicle 100. Further, axle 180 may be configured as an e-axle in which gearbox 140 and motors 104-1 and 104-2 are positioned within a common housing.

Further, VCM 130 may be communicatively coupled to pedal 142. When a user of vehicle 100 uses pedal 142, information is sent to VCM 130. In exemplary embodiments, pedal 142 may be an accelerator pedal. In exemplary embodiments, pedal 142 may be any mechanical or electronic user input that provides vehicle 100 information to VCM 130 to determine a desired motor speed and/or total torque request. For example, VCM 130 may be informed by a cruise control option selected by a driver of vehicle 100. In exemplary embodiments, it may be a different option or button on a screen or control panel that indicates a desired speed to VCM 130.

Based at least in part on the information received from pedal 142, VCM 130 determines a total torque value requested by the user. VCM 130 communicates one or more torque commands reflecting this total torque value to inverter(s) 102 to power operating motors 104 to generate the requested total torque. As described herein, "operating motors" are two or more motors 104 between which the total torque value requested by the user is split. For example, in the example embodiment shown in FIG. 1, inv+mot 106-1 and inv+mot 106-2 are mechanically coupled to axle 180 via gearbox 140, such that torque output by motors 104 rotates axle 180 via gearbox 140. In one example, axle 180 may be driving only two wheels of vehicle 100 (such as wheels 182) and inv+mot(s) 106-1 and 106-2 are responsible to power axle 180 and subsequently, drive the two wheels 182 of vehicle 100 connected to axle 180. Other inv+mot(s) 106-n may be responsible to power one or more different axles that may drive additional wheels of vehicle 100. Accordingly, in such an example, even though vehicle 100 may comprise more than two motors 104, only two motors 104-1 and 104-2 are considered operating motors with respect to a particular total torque request, and the total torque request from VCM 130 is split between inv+mot 106-1 and inv+mot 106-2.

Further, a component in torque management system 110 may have a corresponding efficiency map. Efficiency values for each component may be determined, for example, based on the quotient of the output power of the component and the input power to the component. In exemplary embodiments, each of the inverter(s) 102 and each of the motor(s) 104 have their own efficiency maps. In exemplary embodiments, each combined component ("inv+mot") 106 (comprising an inverter 102 and motor 104) may have a corresponding efficiency map. An efficiency map of an electrical component is a function of various factors represented on different axes of the map. It will be appreciated that efficiency map 200 may represent a function involving any suitable n number of applicable factors or variables.

Figure 2:
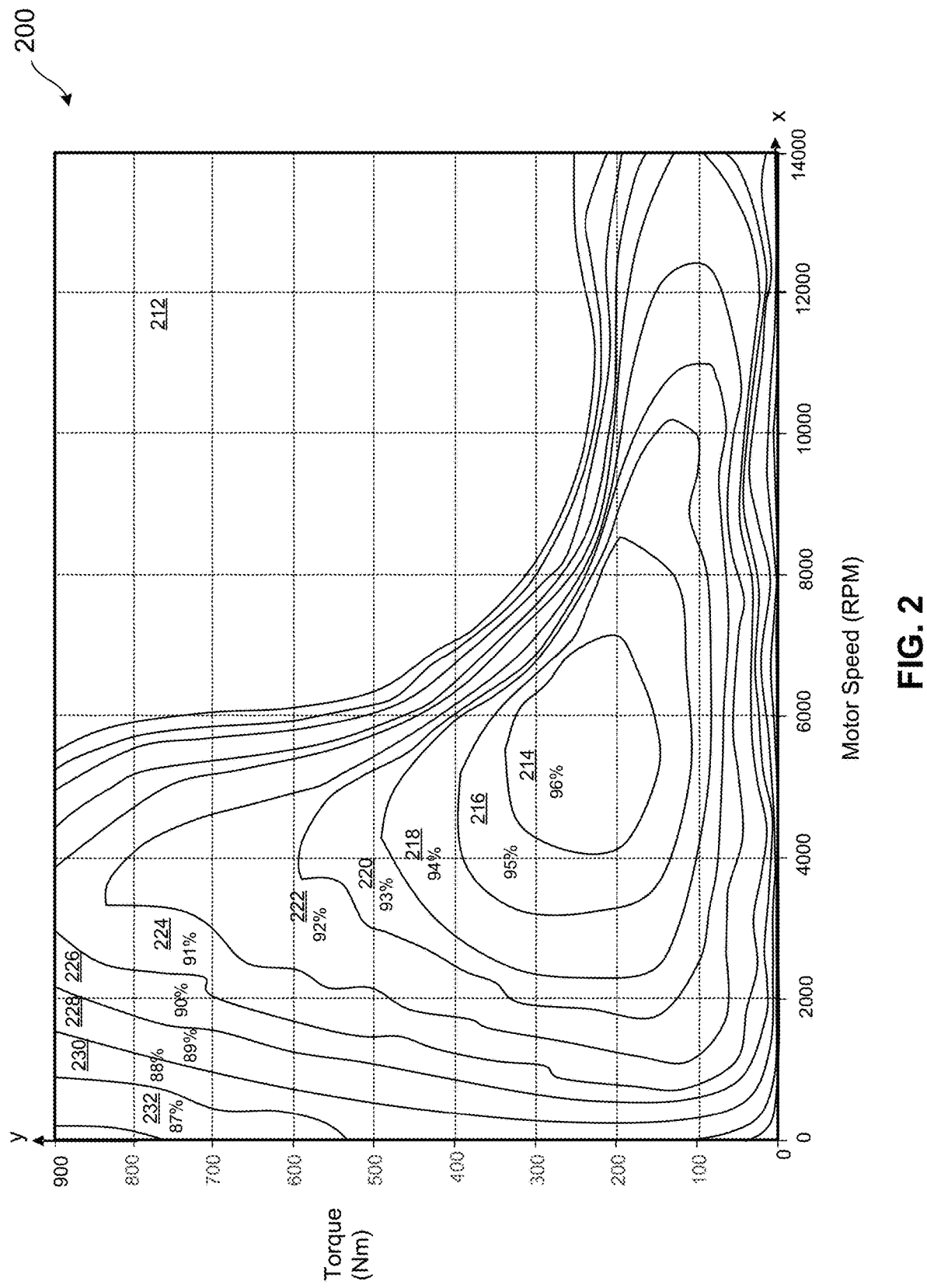
FIG. 2 illustrates an exemplary efficiency map of an inverter and motor of the electric vehicle described in FIG. 1, in accordance with various embodiments.

FIG. 2 shows an exemplary embodiment of an efficiency map 200 for an example inv+mot 106. In exemplary embodiments, values shown on efficiency map 200 are a function of motor 104 speed, torque, and input voltage. Efficiency map 200 is a contour plot for inv+mot 106 at a given voltage. In exemplary embodiments, efficiency map 200 may be a multi-dimensional map, for example a map represented as a function of motor 104 speed, torque, and input voltage for vehicle 100. In exemplary embodiments, temperature of the inverter(s) 102 and/or motor(s) 104 may also be one of the factors considered in efficiency mapping of inv+mot 106.

In efficiency map 200 shown in FIG. 2, motor 104 speed is represented on the x-axis and torque is represented on the y-axis for a given voltage V. Accordingly, in the example shown in FIG. 2, at a given voltage V, when motor 104 speed is 6000 RPM, the efficiency is (at least) 96 percent for a torque value of 200 Newton-meters (Nm) as found in zone 214. Similarly at the given voltage V, the efficiencies in zones 216, 218, 220, 222, 224, 226, 228, 230, and 232 are (at least) 95%, 94%, 93%, 92%, 91%, 90%, 89%, 88%, and 87%, respectively. The efficiency in remaining zone 212 is less than 87%. Consequently, at the given voltage V, for a desired torque output of 200 Nm to be supplied to gearbox 140, operating one motor 104 to produce 200 Nm of torque and the second motor 104 to product 0 Nm of torque provides better efficiency than operating each of the two motors 104 to produce about 100 Nm of torque each.

In exemplary embodiments, more than one solution having the same or similar efficiency is available for certain torque split values. For example, for a total torque request of 500 Nm when motor 104 speed is 4000 RPM at the given voltage V, 95% efficiency could be achieved by splitting the torque request between two 104 motors at 300 Nm and 200 Nm, or at 250 Nm and 250 Nm. In such a case, other factors (such as smoother transition in torque values for a motor 104, better performance by each motor 104, and the like) may be considered to determine a selected torque split. These factors may be considered either prior to the operation of vehicle 100 or while vehicle is in operation. Moreover, the other factors considered at a certain point during vehicle operation may differ from the other factors considered at another point during vehicle operation. Stated another way, torque management system 100 may make dynamic adjustments to achieve a desired level of efficiency or other performance objectives associated with operation of vehicle 100. In the example shown in FIG. 2, efficiency map 200 is a contour plot for positive torque values. However, in other exemplary embodiments, efficiency map 200 may be plotted for negative torque values as well.

Figure 3:
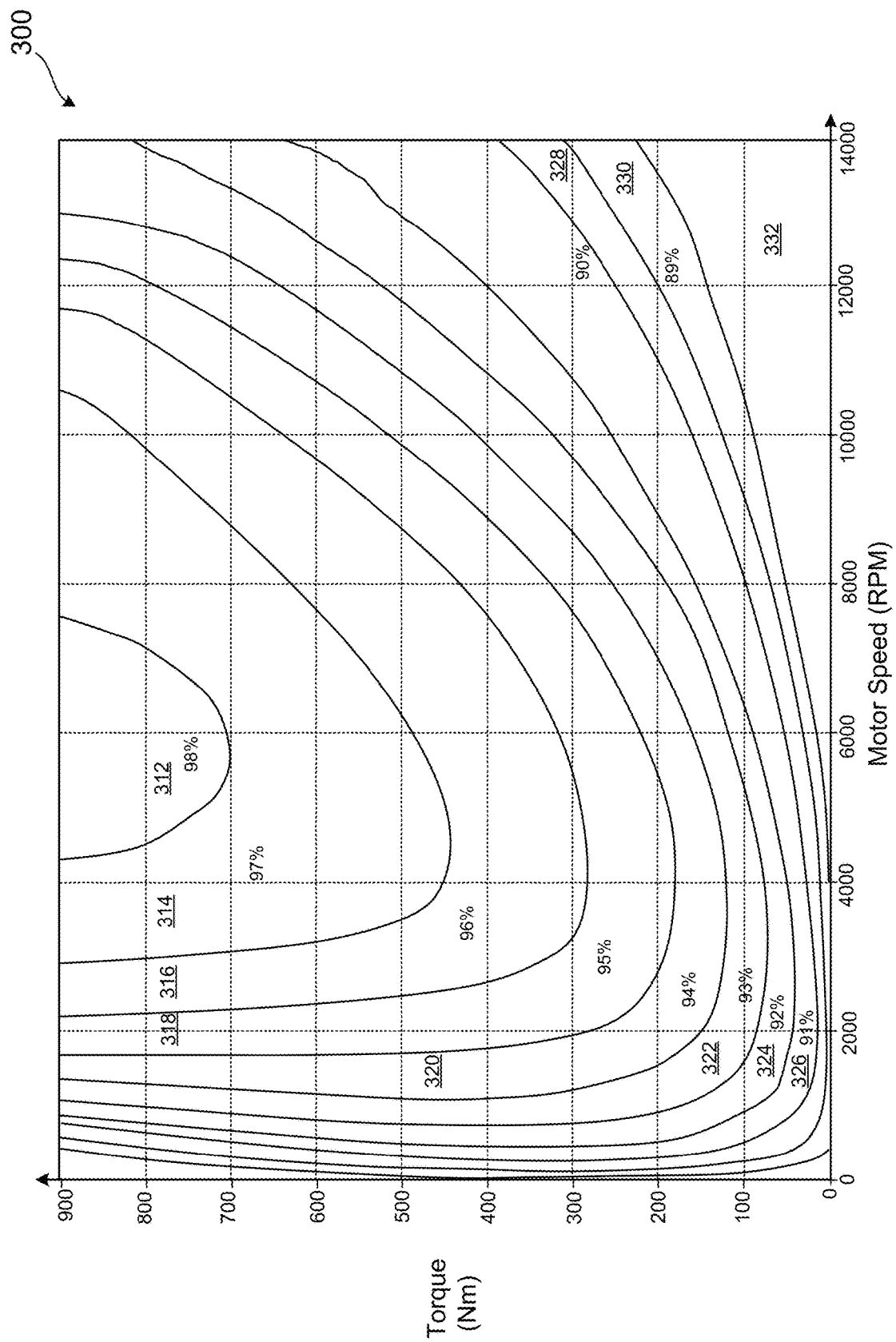
FIG. 3 illustrates an exemplary efficiency map of a gearbox of the electric vehicle described in FIG. 1, in accordance with various embodiments.

Similarly, gearbox 140 has its own efficiency map. FIG. 3 shows an exemplary embodiment of an efficiency map 300 for an example gearbox 140. Efficiency map 300 is a function of motor 104 speed, torque value, and temperature of gearbox 140. Motor 104 speed is represented on the x-axis and torque is represented on the y-axis. In exemplary embodiments, a temperature of gearbox 140 is a third input considered in plotting efficiency map 300. In the example shown in FIG. 3, efficiency map 300 is plotted at an optimal temperature. In the example shown in FIG. 3, when motor 104 speed is 8000 RPM and the torque requested is 300 Nm, the efficiency of gearbox 140 is (at least) 94% as found in zone 320. The efficiencies for gearbox 140 in zones 312, 314, 316, 318, 320, 322, 326, 328, and 330 are (at least) 98%, 97%, 96%, 95%, 94%, 93%, 92%, 91%, 90%, and 89%, respectively. The efficiency in remaining zone 332 is less than 89%. Accordingly, using efficiency maps 200 and 300, efficiency values of both inv+mot 106 and gearbox 140 may be considered in determining torque split values for each motor 104 for a given voltage, motor 104 speed, and total torque request. In the example shown in FIG. 3, efficiency map 300 is a contour plot for positive torque values. However, in other exemplary embodiments, efficiency map 300 may be plotted for negative torque values as well.

Turning back to FIG. 1, the power output of a rotating motor, such as motor 104, is given by:

$$P = \tau \times v / 9549.3 \quad \text{(Equation 1)}$$

where P is the power of motor 104 in kilowatts (KW), $\tau$ is the torque of the motor 104 in Nm, and v is the speed of motor 104 in revolutions per minute (RPM). The product of torque $\tau$ and speed v is divided by a factor of 9549.3 to convert the unit Nm-RPM to a value of power in kW. A combined torque request $\tau_{req}$ may be obtained as a sum of the torque requested from all motors 104. Thus, combined torque request $\tau_{req}$ equals $\tau_1 + \tau_2 + \ldots + \tau_n$, where $\tau_1$ to $\tau_n$ are torque values of all motors 104-1 through 104-n, respectively. Accordingly, for a two-motor system the input power to inv+mot 106 may be calculated as follows:

$$P_{in} = \frac{\tau_1 \times v}{\eta_{mot1}} + \frac{\tau_2 \times v}{\eta_{mot2}} \quad \text{(Equation 2)}$$

where v is the motor 104 speed, $\tau_1$ and $\tau_2$ are torque values for motors 104-1 and 104-2, and $\eta_{mot1}$ and $\eta_{mot2}$ are the efficiencies from inv+mot pairs 106-1 and 106-2 given the speed, torque, and voltage input. Efficiencies $\eta_{mot1}$ and $\eta_{mot2}$ may be determined by using efficiency map 200 for the given variables (i.e. speed, torque, and voltage input). Accordingly, the power input values $P_{in}$ to the two-motor system for different combinations of torque values $\tau_1$ and $\tau_2$ may be determined by Equation 2. In exemplary embodiments, these power input values $P_{in}$ may then be stored in a memory 144. Memory 144 may be communicatively coupled to VCM 130 and the power input values $P_{in}$ stored in memory 144 can be accessed by VCM 130 as desired.

The power output of inv+mot pairs 106 is the input power to gearbox 140. For a two-motor system, the power output from gearbox 140 may be calculated as follows:

$$P_{out} = (\tau_1 \times v_1) \times \eta_{gb1} + (\tau_2 \times v_2) \times \eta_{gb2} \quad \text{(Equation 3)}$$

where $v_1$ and $v_2$ are motor speeds for motors 104-1 and 104-2, $\tau_1$ and $\tau_2$ are torque values for motors 104-1 and 104-2, and $\eta_{gb1}$ and $\eta_{gb2}$ are the efficiencies of gearbox 140 driven by each motor 104 given the speed, torque input, and temperature of the gearbox. In a two-motor system, such as the one shown in FIG. 1, a total torque request may be split into various combinations of torque split values (i.e., a first torque value and a second torque value, which when combined always equal the total torque request). Each combination includes a first torque value to be supplied by a first motor (such as motor 104-1) and a second torque value to be supplied by a second motor (such as motor 104-2).

Further, in the exemplary embodiment shown in FIG. 1, gearbox 140 includes a first gear train 140-1 connected to first motor 104-1 and a second gear train 140-2 connected to second motor 104-2. A first gearbox efficiency value $\eta_{gb1}$ is a partial efficiency of gearbox 140 based on first gear train 140-1 driven by first motor 104-1. Similarly, a second gearbox efficiency value $\eta_{gb2}$ is a partial efficiency of gearbox 140 based on second gear train 140-2 driven by second motor 104-2. Accordingly, an efficiency value of gearbox 140 at each of the first torque value and the second torque value is considered in determining the power output from gearbox 140. Efficiencies $\eta_{gb1}$ and $\eta_{gb2}$ may be determined by using an efficiency map (such as efficiency map 300) for the given variables. Thus, the power output values $P_{out}$ from gearbox 140 for a two-motor system for different combinations of torque values t, and 12 may be determined by Equation 3. In further exemplary embodiments, first gear train 140-1 and second gear train 140-2 may be similar or identical, and a single efficiency map may be utilized in determining efficiency values $\eta_{gb1}$ and $\eta_{gb2}$. In exemplary embodiments, these power input values may then be stored in a memory 144. Memory 144 may be coupled to VCM 130 and the power input values stored in memory 144 can be accessed by VCM 130 as desired.

Total power loss $P_{loss}$ for a given total torque request from VCM 130 may be determined by calculating the difference between the input power $P_{in}$ to inv+mot pairs 106 and output power $P_{out}$ from gearbox 140. That is, $P_{loss} = P_{in} - P_{out}$. Using Equations 2 and 3, total power loss $P_{loss}$ for a two-motor system may be calculated as follows:

$$P_{loss} = v \times \left[ \left( \frac{1}{\eta_{mot1}} - \eta_{gb1} \right) \times \tau_1 + \left( \frac{1}{\eta_{mot2}} - \eta_{gb2} \right) \times \tau_2 \right] \quad \text{(Equation 4)}$$

where v is motor speed for motor(s) 104. $\tau_1$ and $\tau_2$ are torque values for motors 104-1 and 104-2, and $\eta_{gb1}$ and $\eta_{gb2}$ are the efficiencies of gearbox 140 driven by each motor 104 given the speed, torque input, and temperature of the gearbox. In the example using Equation 4, motors 104-1 and 104-2 are similar, and the speed v of the two motors is substantially similar. However, when motors 104-1 and 104-2 are not similar, speed $v_1$ is the motor speed of motor 104-1 and speed 12 is the motor speed of motor 104-2. Thus, the power loss $P_{loss}$ can be computed by splitting the total torque request value between two or more motors 104 at any desired ratio. For example, for a total torque request value of 200 Nm at a rotating motor speed of 6000 RPM, $P_{loss}$ values maybe computed by splitting the total torque request equally between motors 104 (i.e, $\tau_1=100$ Nm and $\tau_2=100$ Nm) and/or splitting the total torque request unequally between motors 104 (i.e. $\tau_1=101$ Nm and $\tau_2=99$ Nm, $\tau_1=101.1$ Nm and $\tau_2=98.9$ Nm, $\tau_1=102$ Nm and $\tau_2=98$ Nm, $\tau_1=150$ Nm and $\tau_2=50$ Nm, $\tau_1=199$ Nm and $\tau_2=1$ Nm, $\tau_1=200$ Nm and $\tau_2=0$ Nm, or any other torque split combination). The inv+mot 106 and gearbox 140 efficiency values used in Equation 4 for each respective torque split combination may be determined using efficiency maps, such as efficiency maps 200 and 300, respectively.

Equation 4 solves for power loss $P_{loss}$ for a two-motor system. However, Equation 4 may be used for any multi-motor system. For example, for a three-motor system, wherein a third motor 104 is coupled to gearbox 140, power loss may be calculated as follows:

$$P_{loss} = v \times \left[ \left( \frac{1}{\eta_{mot1}} - \eta_{gb1} \right) \times \tau_1 + \left( \frac{1}{\eta_{mot2}} - \eta_{gb2} \right) \times \tau_2 + \left( \frac{1}{\eta_{mot3}} - \eta_{gb3} \right) \times \tau_3 \right]$$

where the total torque request is split in three parts $\tau_1$, $\tau_2$, and Is based on efficiencies for all three inv+mot 106 and gearbox 104 efficiencies for each of the torque split values $\tau_1$, $\tau_2$, and $\tau_3$.

In other exemplary embodiments, $P_{loss}$ may be computed using a different equation, for example based on connection(s) between one or more gearboxes 140 and one or more inv+mot 106. In exemplary embodiments, each of the multiple inv+mot(s) 106 may be mechanically coupled to its own respective individual gearbox 140, and the multiple gearboxes 140 may then be further coupled to a single axle 180. In exemplary embodiments, each of the multiple inv+mot(s) 106 may be mechanically coupled to its own respective individual gearbox 140, and each of the multiple gearboxes 140 are then coupled to its own axle 180. In exemplary embodiments, some of the multiple inv+mot(s) 106 may be mechanically coupled to one of the multiple gearboxes 140, and other multiple inv+mot(s) 106 may be mechanically coupled to a second of the multiple gearboxes 140. Accordingly, the inv+mot 106, gearbox(es) 140, and axle(s) 180 may be connected in various combinations depending on the needs of vehicle 100. Consequently, the equation for $P_{loss}$ in these embodiments may be different from the one provided in Equation 4. However, as in the embodiment shown in FIG. 1, the value of $P_{loss}$ in these embodiments may be computed using efficiency values for each of the operating inv+mot 106 and each of the operating gearboxes 140.

Further, using Equation 4, power loss $P_{loss}$ may be computed for varying values of torque, speed, and voltage at which inv+mot(s) 106 and gearbox 140 can operate. In exemplary embodiments, the power loss value(s) $P_{loss}$ computed at each operating point is stored in memory 144, and may be accessed by VCM 130. As described herein, an operating point includes voltage input, speed of motor 104, and total torque requested ($\tau_{req}$). For each operating point, multiple $P_{loss}$ values may then be computed using different combinations of torque split values for multiple inv+mot(s) 106 and consequently, respective inv+mot 106 and gearbox 104 efficiency values.

Energy Mode

Conceptually, $P_{loss}$ values at each operating point may be considered to be indicative of relative energy conservation (i.e., using less energy) or relative energy waste (i.e. using more energy) A lower $P_{loss}$ value indicates conservation of energy and a higher $P_{loss}$ value indicates waste of energy. Accordingly, a determination of torque split values for maximum conservation of energy or maximum waste of energy may be based on the $P_{loss}$ values at each operating point. In exemplary embodiments, torque split values providing maximum conservation of energy (conservation torque split values) for each operating point are stored in memory 144. In exemplary embodiments, torque split values providing maximum waste of energy (waste torque split values) for each operating point are stored in memory 144.

When vehicle 100 is in operation, VCM 130 may choose to operate vehicle 100 in one of two energy management modes: "energy conservation" mode or "energy waste" mode. In various embodiments, VCM 130 may select the energy management mode based on one or more inputs, for example battery state of charge (SOC) associated with HV battery assembly 102. Vehicle 100 may be operated in energy conservation mode to conserve overall energy of one or more vehicle systems (such as a high voltage battery system of vehicle 100). For example, during motoring, operating vehicle 100 in an energy conservation mode will extend the total driving range of the vehicle 100. During motoring, the net torque generated by operating motors 104 is usually positive, requiring electrical energy to be drawn from by battery assembly 120, thereby reducing the overall electrical energy stored in vehicle 100. By drawing a lower amount of electrical energy per unit of distance traveled, the range of vehicle 100 is increased.

Moreover, as compared to an energy conservation mode, from time-to-time vehicle 100 may be operated in an energy waste mode in order to expend an increased amount energy via one or more vehicle 100 systems. For example, an increase in the amount of electrical energy utilized or consumed by vehicle 100 electrical components (such as, motors(s) 104, inverter(s) 102, and/or gearbox 140) results in an increase in temperature of these components, for example due to resistive heating, frictional losses, or the like. In certain exemplary embodiments, when vehicle 100 is operating where ambient temperatures are below a threshold (for example, −5 degrees Celsius, 0 degrees Celsius, 5 degrees Celsius, 10 degrees Celsius, 20 degrees Celsius, 25 degrees Celsius, or a threshold falling between any two of the foregoing) a portion of the heat produced by the increase in operating temperature of these electrical components may be used by thermal system 146 to manage overall thermal requirements or conditions of vehicle 100. Accordingly, vehicle 100 may be operated in an energy waste mode to increase temperature of one or more of these components.

Additionally, vehicle 100 may operate in regeneration. During regeneration, the net torque generated by at least one of operating motor(s) 104 is negative. For example, when vehicle 100 is slowing down (i.e, braking) or driving downhill, kinetic energy is converted via motor 104 into electrical current and supplied to an energy storage medium (such as HV battery 120). When a determination is made that vehicle 100 may need to operate in regeneration (for example, an upcoming portion of a route may require vehicle 100 to drive downhill), vehicle 100 may operate in waste mode prior to regeneration while vehicle 100 is still motoring. In waste mode, mot+inv 106 and gearbox 140 operate to generate maximum power loss. Accordingly, operating vehicle 100 in waste mode during motoring will drain one or more batteries 120 at a faster pace such that HV batteries 120 will not be fully charged and have capacity to accept electrical energy at a later time when vehicle 100 is operating in regeneration.

Further, in various exemplary embodiments vehicle 100 may operate in an "energy conservation" mode when vehicle 100 is in regeneration. By operating vehicle 100 in an energy conservation mode during regeneration, motor(s) 104 and gearbox 140 may operate more efficiently. That is, the amount of energy being converted to heat in motor(s) 104 and inverter(s) 102 is minimized. Stated another way, by operating vehicle 100 in an energy conservation mode when vehicle 100 is in regeneration a maximum amount of electrical energy may be generated per unit of supplied kinetic energy. The total regenerative torque may be split between multiple motors 104-1 and 104-2, for example based on efficiency values of motors 104 and gearbox 140, and a torque split combination with smallest power loss value may be selected to determine the amount of torque to be generated by each motor 104. For example, under particular conditions where ~500 Nm of torque from motors 140 is desired, a first motor 104-1 may operate to supply ~300 Nm of torque and a second motor 104-2 may operate to supply ~200 Nm of torque; however, any suitable torque split combination may be utilized. It will be appreciated that operating vehicle 100 in conservation mode may increase operation time of vehicle 100 between battery recharging cycles and consequently, extend the range of vehicle 100.

In some instances, vehicle 100 may be operated in an "energy waste" mode during regeneration. For example, when one or more batteries 120 are fully charged and vehicle 100 starts a downward descent, regeneration is unsuitable to be performed because none of batteries 120 are able to accept additional energy. Conventionally, one or more brake resistors may be used as sinks to accept this additional energy. In contrast, by operating vehicle 100 in an energy waste mode, electric motor(s) 104 can also act as sinks to accept this additional energy. Thus, in such a case, the torque values are split between the electric motor(s) 104 to generate maximum power loss, and consequently, a smaller amount of energy is left to be absorbed by the brake resistors of vehicle 100. Thus, the capacity of vehicle 100 to operate in an energy waste mode may reduce the size of brake resistors required by systems of vehicle 100. Stated another way: from time to time, electric motor(s) 104 may intentionally operate in a less efficient current-generating manner in order to produce more heat in electric motor(s) 104 rather than output more electric current.

Thus, when VCM 130 receives a requested total torque value, VCM 130 is configured to first determine a desired motor speed and voltage. VCM 130 is further configured to determine an energy management mode in which vehicle 100 is operating. When vehicle 100 is operating in energy conservation mode, VCM 130 is configured to determine torque split values that provide the minimum power loss at the desired operating point. In exemplary embodiments, VCM 130 can determine this value by accessing the list of conservation torque split values stored in memory 144. When vehicle 100 is operating in an energy waste management mode, VCM 130 is configured to determine the torque split values that provide the maximum power loss at the desired operating point. In exemplary embodiments, VCM 130 can determine this value by accessing the list of waste torque split values stored in memory 144. These torque split values are then used by VCM 130 to generate one or more torque commands that are sent to inverter(s) 102. Based on these torque commands, inverter(s) 102 draw the required current from HV battery assembly 120 to power respective motors 104.

Thermal Balance Algorithm

Another factor that may affect the efficiency of an electrical component is temperature of the component. Excessive heating of an electrical component may result in degradation of component performance and deviation in expected lifetime of the electrical component. Specifically, in a multi-motor embodiment of torque management system 110, splitting torque production unequally between multiple motors 104 may result in unequal thermal loading of these motors 104. For example, using efficiency maps 200 and 300, for a total torque request value of 300 Nm at a rotating motor speed of 8000 RPM, maximum conservation of energy is achieved when the torque is split unequally between two motors 104, with motor 104-1 producing 300 Nm and motor 104-2 producing 0 Nm. This unequal torque split can, after a period of time, result in an imbalance of thermal loading between the two motors 104 and consequently, may alter the efficiency of motor 104-1 as compared to motor 104-2. In other words, a particular motor 104 operating at a higher torque output typically results in a higher temperature for that motor 104, which eventually alters the efficiency of that motor 104 in comparison to the remaining motors 104.

Accordingly, to maintain improved thermal balance between all of the operating motors 104, a thermal balance algorithm may be employed by VCM 130. VCM 130 may be configured to designate a first motor 104 (such as motor 104-1) as a primary motor. The primary motor is responsible for producing the highest of the torque split values (i.e. largest split value). Motor 104-1 remains the primary motor until one or more thermal parameters of the primary motor meets a threshold. The thermal parameter may include one or more of a time period, a time period above a threshold temperature, a threshold temperature, a temperature difference between motors, user input, or the like. When a thermal parameter of the primary motor exceeds the threshold, the primary motor is redesignated as the secondary motor, and a second motor 104 (such as motor 104-2) may be redesignated as the primary motor.

In various embodiments, the second motor may be selected by identifying the coolest available motor 104 (i.e., motor 104 having the lowest temperature). In exemplary embodiments, each motor 104 is coupled to a temperature sensor that measures the temperature of the respective motor 104. In some exemplary embodiments, the temperature sensor determines a temperature of a coolant configured to thermally condition the relevant motor 104. These temperature values may be sent to VCM 130. Accordingly, VCM 130 is configured to monitor temperatures of all the operating motors 104. Using these temperature values, VCM 130 may determine the coolest motor 104 available. VCM 130 may further be configured to measure time. The thermal balance algorithm may be repeated to allow the second motor 104-2 to operate as a primary motor. Accordingly, in a repeated iteration of the algorithm, from the resulting torque split values, second motor 104-2 may be responsible for producing the highest of the multiple torque split values.

Accordingly, in exemplary embodiments, each torque split value at an operating point is assigned to a specific operating motor 104 based, in part, on the temperature of the operating motor 104. The motor 104 having the lowest temperature may be designated as the primary motor and a final torque value of the primary motor 104 is the largest split value. Similarly, the motor 104 having the highest temperature may be assigned the smallest portion of the torque split values, and as such has a final torque value that is the lowest from among all the torque split values. Other operating motors 104 may similarly have a final torque value determined from all torque split values at the operating point based on temperature of the operating motor. Thus, in a two-motor system, the two torque split values are flipped or alternated between motors 104-1 and 104-2. In exemplary embodiments, wherein the multi-motor system operates using more than two motors 104, more than two torque split values are to be assigned, and each operating motor 104 gets assigned a torque split value based on its temperature in comparison with the other operating motors 104.

In exemplary embodiments, the thermal parameter may be a time period, i.e., an amount of time a particular motor 104 may operate under a "primary" designation. Accordingly, for example, motor 104-1 remains a primary motor for a predetermined amount of time. After the primary motor has operated for the predetermined amount of time, the primary motor may be designated as the secondary motor. The second motor 104-2 is then selected as the primary motor, and may operate for a predetermined amount of time. In an exemplary embodiment, the predetermined amount of time is between 20 seconds and 10 minutes. In further exemplary embodiments, the predetermined amount of time is in a range of between 100 seconds and 300 seconds. So, in a particular example, if the thermal parameter is 5 minutes, and the total torque request is 500 Nm, a first motor 104 may be designated as primary for 5 minutes and produce 300 Nm of torque, and a second motor 104 may be designated as a secondary motor and produce 200 Nm of torque during that same period. The situation is then reversed for the next five minutes, and so forth.

In exemplary embodiments, the thermal parameter may be a time period above a threshold temperature, i.e., an amount of time a particular motor 104 may operate under a "primary" designation above a given temperature value. Accordingly, for example, motor 104-1 remains a primary motor for a predetermined amount of time above a threshold temperature. After the primary motor has operated for the predetermined amount of time above the threshold temperature, the primary motor may be designated as the secondary motor. The second motor 104-2 is then selected as the primary motor, and may operate according to the same or other thermal parameter.

In exemplary embodiments, the thermal parameter may be a threshold temperature value associated with a motor 104. Specifically, temperature values measured for the primary motor are sent to VCM 130 while the primary motor is operating. When the temperature of the primary motor exceeds a threshold temperature, regardless of the amount of time above the threshold temperature, the primary motor is redesignated as a secondary motor. Based on the measured temperature values received from the remaining motors 104, VCM 130 is configured to select a motor 104 having the lowest temperature value and redesignate the selected motor 104 as a primary motor until it reaches the threshold temperature.

In exemplary embodiments, the thermal parameter may be a difference between the temperatures of the motors. VCM 130 is configured to monitor measured temperature values for each operating motor 104. Further. VCM 130 is configured to determine temperature difference between primary motor 104-1 and a secondary motor 104-2. When the temperature difference exceeds a threshold, the primary motor 104-1 is designated as a secondary motor and secondary motor 104-2 is designated as a primary motor VCM 130 continues to monitor the primary motor 104 and the secondary motor 104 and determine the difference between the two. When the difference exceeds the threshold, motor 104-2 is redesignated as a secondary motor and motor 104-1 is redesignated as a primary motor. In exemplary embodiments, the difference is in a range of between 10 degrees Celsius and 40 degrees Celsius.

In exemplary embodiments, the thermal parameter may be user input. Accordingly, a user (such as a driver of vehicle 100) may request a motor switch even when one or more other thresholds have not been met. In exemplary embodiments, user input may comprise a request to switch designation of primary motor. In exemplary embodiments, user input may comprise a request to change the amount torque being produced by the primary motor. In exemplary embodiments, user input may comprise a direct input, such as a request to switch designation of primary motor from one motor 104 to another motor 104. In exemplary embodiments, user input may comprise an indirect input such as an input via a throttle pedal, such that when the user uses the throttle pedal, VCM 130 is configured to switch the designation of primary motor from one motor 104 to another motor 104.

In exemplary embodiments, the thermal parameter may be a combination of any of the thermal parameters. That is, designation of primary motor switching from one motor 104 to another motor 104 may occur when any one of the thermal parameters (time period, time period above a given temperature, a given temperature, temperature difference, user input) or any combination thereof exceed a given threshold. The final torque values for each operating motor 104 are then sent to VCM 130. Based on this information from VCM 130, inverter(s) 102 draw the appropriate current from HV battery assembly 120 to power respective motor(s) 104.

In exemplary embodiments, VCM 130 performs a thermal balance algorithm to determine torque values for each operating motor 104 until the thermal parameter(s) converge to or otherwise reach an upper limit. In exemplary embodiments, the upper limit may be time. That is, after a given amount of time has passed, a thermal balance algorithm will not be employed by VCM 130. In exemplary embodiments, the time may be about 10 minutes. In other exemplary embodiments, the time may be between 7 minutes and 13 minutes. In exemplary embodiments, the upper limit may be a temperature value associated with a given motor. In exemplary embodiments, in a two-motor embodiment of torque management system 120, designation of primary motor may switch consistently between motors 104-1 and 104-2 based on temperature difference therebetween. VCM 130 may also regularly compare temperatures of both motors 104 to a threshold temperature. When the temperature of both motors 104-1 and 104-2 are equal to or greater than the threshold temperature, VCM 130 will stop thermal balancing of motors 104. In exemplary embodiments, the threshold temperature is 120° C. In other exemplary embodiments, the threshold temperature is between 110 degrees Celsius and 130 degrees Celsius. In exemplary embodiments, when the thermal parameters are determined to have exceeded the upper limit, torque management system 120 will automatically split the total torque request equally between all the operating inv+mot(s) 106.

Figure 4:
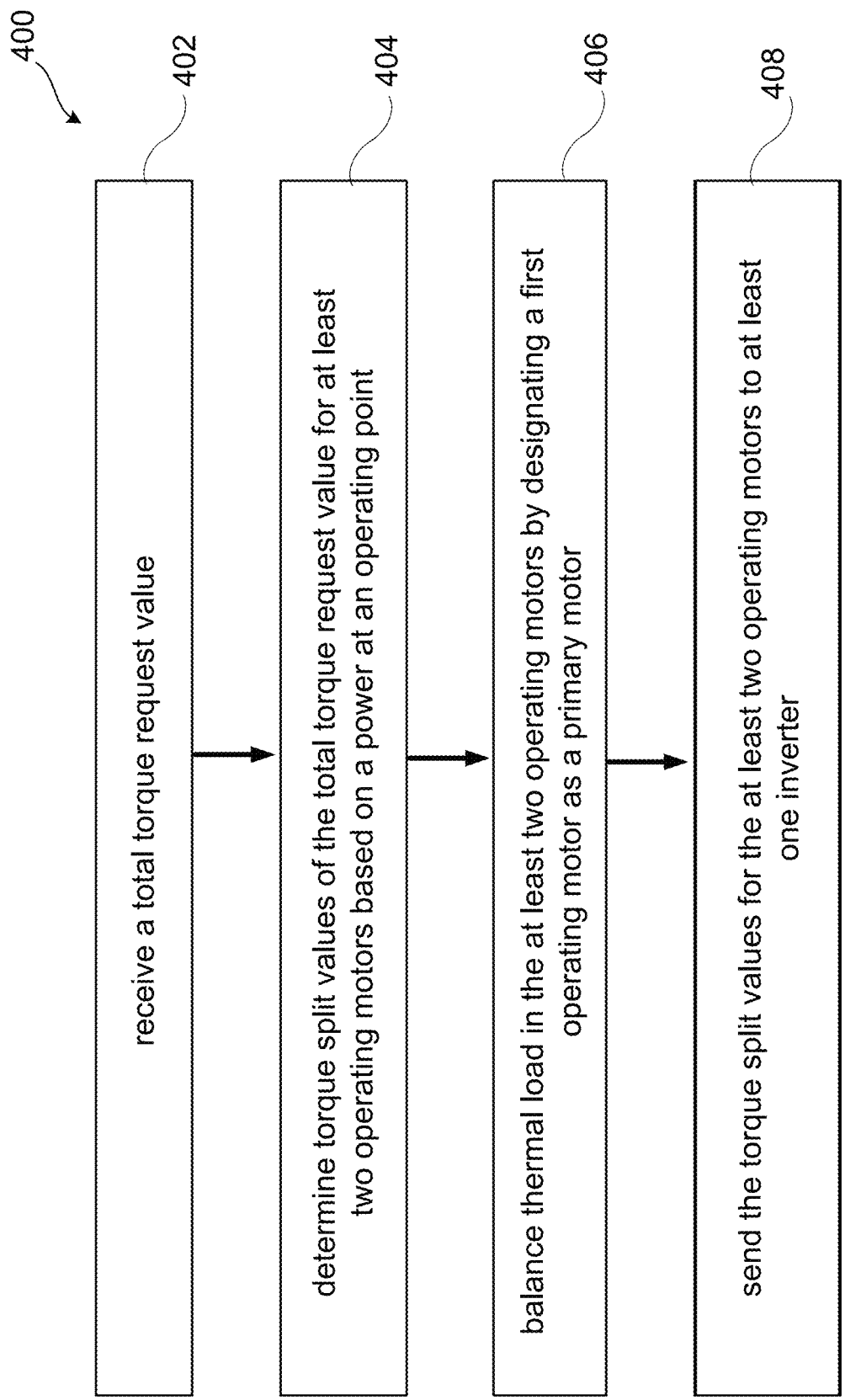
FIG. 4 illustrates a flow diagram for torque management for an electric vehicle, in accordance with various embodiments.

FIG. 4 is a flow diagram of an exemplary embodiment of a method 400 for torque management in a multi-motor system for an electric vehicle (such as vehicle 100). As discussed herein, method 400 is described with respect to examples of vehicle 100 as shown in FIG. 1. However, method 400 may apply to other examples of electric vehicles as well.

In the example shown in FIG. 4, method 400 comprises receiving a total torque request value (step 402). In exemplary embodiments, the total torque request may be received at a given vehicle ECU, for example, a VCM (such as VCM 130). In exemplary embodiments, the VCM sends this request based on the measurements received from an acceleration component. The acceleration component may be an accelerator pedal, a brake pedal, a cruise control algorithm, or any other known acceleration component for an electric vehicle.

Method 400 further comprises determining the split in torque values for each operating motor in a plurality of operating motors based on a power loss at the operating point (step 404). In exemplary embodiments, the desired operating point considers inputs such as operating voltage, total requested torque, and a speed of each of the operating motors. The inputs may further include efficiency values for a combination of the operating motor and its respective inverter at each of the operating point(s) to determine the torque split value.

In exemplary embodiments, determining the torque split values further comprises determining an energy management mode. When vehicle 100 is determined to be in an energy conservation mode, determining the split in torque value further comprises determining torque split values based on a minimum value for power loss at the operating point. When vehicle 100 is determined to be in an energy waste mode, determining the split in torque values further comprises determining torque split values based on maximum value for power loss at the operating point.

Method 400 further comprises balancing thermal load in the plurality of operating motors (step 406). In exemplary embodiments, balancing thermal load further comprises monitoring temperature values for all operating motors. The method further comprises designating a first operating motor as a primary motor, wherein the primary motor is responsible for producing the highest split of the torque split values. In exemplary embodiments, when a thermal parameter of the primary motor exceeds a threshold, the method further comprises identifying a second operating motor with the smallest temperature value, designating the first operating motor as a secondary motor, and designating the second operating motor as the primary motor.

In exemplary embodiments, the thermal parameter is time. In exemplary embodiments, the thermal parameter is a time period above a threshold temperature. In exemplary embodiments, the thermal parameter is a threshold temperature. In exemplary embodiments, the thermal parameter is temperature difference between the operating motors. In exemplary embodiments, the thermal threshold is user input requesting a switch in designation of the primary motor. Method 400 may further comprise sending the final torque value for each of the plurality of operating motors to at least one inverter (step 408). In exemplary embodiment, sending the final torque value for each of the plurality of operating motors comprises sending a torque split value to an inverter associated with each operating motor.

Illustrative Example for Torque Split Combination

The following table illustrates application of Equation 4 in a two-motor torque management system, for various examples of torque split value combinations in an instance when the total torque requested by the VCM is 500 NM at a motor speed of 4000 RPM. Five combinations of torque split values are provided below. However, other combinations may be considered in determining the torque split values for maximum and minimum loss of power.

$$\tau_{total} = 500 \text{ NM}; v = 4000 \text{ RPM} \quad \text{(Equation 4)}$$

$$P_{loss} = v \times \left[ \left( \frac{1}{\eta_{mot1}} - \eta_{gb1} \right) \times \tau_1 + \left( \frac{1}{\eta_{mot2}} - \eta_{gb2} \right) \times \tau_2 \right]$$

Efficiency values $\eta_{mot1}$ and $\eta_{mot2}$ for Motor 1 and Motor 2 are obtained by using exemplary efficiency map 200. In the example shown in Table 1, Motor 1 and Motor 2 are identical and/or similar to one another (for example, having a common model number, configuration, and/or the like). Accordingly, the same efficiency map 200, illustrated in FIG. 2, may be utilized to obtain efficiency values for both motors at the given torque values. Similarly, efficiency values for gearbox at given torque values are obtained by using exemplary efficiency map 300 as illustrated in FIG. 3. These values may be used in Equation 4 to derive the power loss value for each torque split combination 1-5 shown in Table 1. Using Equation 1, the power loss value may then be further divided by a factor of 9549.3 to derive a power loss value in kilowatts (KW).

As seen in Table 1, in an operational example, a total torque of 500 NM may be requested at a motor speed of 4000 RPM. In Combination 1, Motor 1 generates 250 NM of the total requested torque and Motor 2 also generates 250 NM. The power loss value derived for Combination 1 is 21.495 kW. In Combination 2, Motor 1 is responsible for generating 300 NM of total requested torque and Motor 2 is responsible for generating 200 NM. The power loss value derived for Combination 2 is 20.238 KW. Accordingly, for a torque request of 500 NM at a motor speed of 4000 RPM, an unequal torque split combination, such as Combination 2, conserves more energy for the overall vehicle system 110 than an equal torque split combination, such as Combination 1.

Thus, when vehicle 100 is operating in an energy conservation mode, torque may be split between Motor 1 and Motor 2 using Combination 2. However, in some instances, for example after employing a thermal balance algorithm, it may be determined that one or more thermal parameters have exceeded the upper thermal limit. In such an instance, VCM 130 may be configured to use Combination 1 (and thus split torque equally between Motor 1 and Motor 2) even though Combination 2 provides a smaller power loss value.

Further, of the five exemplary combinations illustrated in Table 1, Combination 2 produces the smallest power loss value of 20.238 KW and Combination 5 produces the largest power loss value of 27.55 KW. Accordingly, when vehicle 100 is operating in an energy conservation mode, torque may be split between Motor 1 and Motor 2 using Combination 2 to conserve energy; and when vehicle 100 is operating in an energy waste mode, torque may be split between Motor 1 and Motor 2 using Combination 5 to waste (i.e., expend) the most energy.

However, as seen in Table 1, in Combination 5, Motor 1 generates a positive torque and Motor 2 generates a negative torque. In exemplary embodiments, it may be determined by a user or VCM 130 that Motor 1 and Motor 2 may not be permitted to generate negative torque. When such limits are present, VCM 130 may select a torque split combination

TABLE 1

| | Motor 1 | | | Motor 2 | | | |
|---|---|---|---|---|---|---|---|
| Combinations | $\tau_1$ (NM) | $\eta_{mot1}$ (%) | $\eta_{gb1}$ (%) | $\tau_2$ (NM) | $\eta_{mot2}$ (%) | $\eta_{gb2}$ (%) | $P_{loss}$ (kW) |
| 1 | 250 | 96 | 95 | 250 | 96 | 95 | 21.495 |
| 2 | 300 | 96 | 96 | 200 | 96 | 94 | 20.238 |
| 3 | 400 | 94 | 96 | 100 | 93 | 93 | 23.481 |
| 4 | 700 | 92 | 97 | −200 | 95 | 95 | 25.69 |
| 5 | 800 | 92 | 97 | −300 | 95 | 96 | 27.55 | where both motors generate a positive torque value. For example, in Combination 5, Motor 1 generates 800 NM of total torque requested and Motor 2 generates −300 NM. In Combination 3, Motor 1 generates 400 NM of total torque requested and Motor 2 generates 100 NM. The power loss value derived for Combination 5 is 27.55 KW and the power loss value derived for Combination 3 is 23.481. While Combination 5 provides a larger power loss value than Combination 3, when selection of a combination is limited to combinations having only positive torque split values, torque may be split between Motor 1 and Motor 2 using Combination 3.

In order to achieve these and/or other objectives, and to provide for improved safety, modularity, control, and/or management of battery components of an electric vehicle, principles of the present disclosure contemplate use of exemplary systems and methods as disclosed herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for torque management in a multi-motor electric vehicle, the method comprising:
    receiving a total torque request value at a vehicle control module (VCM) of the multi-motor electric vehicle;
    determining, by the VCM, a first torque split value associated with a first motor of the multi-motor electric vehicle and a second torque split value associated with a second motor of the multi-motor electric vehicle, the sum of the first torque split value and the second torque split value being equal to the total torque request value;
    monitoring a thermal parameter of at least one of the first motor or the second motor;
    adjusting, by the VCM, the first torque split value and the second torque split value in response to the thermal parameter exceeding a threshold; and
    communicating, by the VCM, the first torque split value and the second torque split value, thereby causing the first motor and the second motor to operate at the first torque split value and the second torque split value, respectively,
    wherein determining the first torque split value and the second torque split value comprises:
        determining an energy management mode of the multi-motor electric vehicle;
        when the energy management mode is determined to be an energy conservation mode, selecting the first torque split value and the second torque split value based on a minimum value for a power loss at an operating point; and
        when the energy management mode is determined to be an energy waste mode, selecting the first torque split value and the second torque split value based on a maximum value for the power loss at the operating point.

2. The method of claim 1, wherein the multi-motor electric vehicle comprises a first inverter electrically coupled to the first motor and a second inverter electrically coupled to the second motor.

3. The method of claim 1, wherein the thermal parameter comprises at least one of a time period, a time period above a threshold temperature, a threshold temperature, or a difference between the temperature associated with the first motor and the temperature associated with the second motor.

4. A method for managing torque in a multi-motor electric vehicle, the method comprising:
    receiving a total torque request value at a vehicle control module (VCM) of the multi-motor electric vehicle;
    determining, by the VCM, an energy management mode of the multi-motor electric vehicle, wherein the energy management mode is based, in part, on a state of charge (SOC) of a high voltage battery assembly;
    determining, by the VCM and based on the energy management mode of the multi-motor electric vehicle, a first torque split value of a first motor of the multi-motor electric vehicle and a second torque split value of a second motor of the multi-motor electric vehicle, wherein the first torque split value and the second torque split value are based, in part, on a power loss at an operating point;

selecting, by the VCM, an energy waste mode as the energy management mode when the SOC of the high voltage battery assembly is at a maximum and a regenerative braking event is anticipated; and communicating, by the VCM, the first torque split value and the second torque split value, thereby causing the first motor and the second motor to operate at the first torque split value and the second torque split value, respectively.

5. The method of claim 4, wherein the power loss is determined based on a first efficiency of the first motor and a first inverter electrically coupled to the first motor and a second efficiency of the second motor and a second inverter electrically coupled to the second motor.

6. The method of claim 4, wherein the operating point is determined using inputs of voltage, a speed of the first motor and a speed of the second motor, and the total torque request value.

7. The method of claim 4, wherein the multi-motor vehicle comprises:
- a first inverter-motor assembly comprising a first inverter and the first motor, wherein the first inverter is electrically coupled to the first motor;
- a second inverter-motor assembly comprising a second inverter and the second motor, wherein the second inverter is electrically coupled to the second motor,
- wherein the VCM is communicatively coupled to the first inverter and the second inverter, and
- wherein the high voltage battery assembly is communicatively coupled to the VCM and electrically coupled to the first inverter and the second inverter.

* * * * *